United States Patent

Kosuge et al.

[11] Patent Number: 5,958,369
[45] Date of Patent: Sep. 28, 1999

[54] TITANIUM-CONTAINING POROUS SILICA AND PROCESS OF PREPARING SAME

[75] Inventors: Katsunori Kosuge, Tsukuba, Japan; Puyam Sobhindro Singh, Imphal, India

[73] Assignee: Director-General of Agency of Industrial Science and Technology, Japan

[21] Appl. No.: 09/045,700

[22] Filed: Mar. 23, 1998

[30] Foreign Application Priority Data

May 30, 1997  [JP]  Japan ................................ 9-158073

[51] Int. Cl.[6] ................................................ C01B 33/20
[52] U.S. Cl. ........................ 423/705; 423/713; 423/326
[58] Field of Search ................................ 423/705, 713, 423/326

[56] References Cited

U.S. PATENT DOCUMENTS

| | | | |
|---|---|---|---|
| 4,410,501 | 10/1983 | Taramasso et al. | 423/713 |
| 4,853,202 | 8/1989 | Kuznicki et al. | 423/326 |
| 5,082,641 | 1/1992 | Popa et al. | 423/326 |
| 5,098,684 | 3/1992 | Kresge et al. | 423/326 |
| 5,374,747 | 12/1994 | Saxton et al. . | |
| 5,712,402 | 1/1998 | Pinnavaia et al. | 552/309 |
| 5,795,555 | 8/1998 | Alive et al. | 423/326 |

FOREIGN PATENT DOCUMENTS

| | | |
|---|---|---|
| 655 278 | 5/1995 | European Pat. Off. . |
| 407300312 | 11/1995 | Japan . |
| 409328312 | 12/1997 | Japan . |

OTHER PUBLICATIONS

Corma et al., "Sythesis of an Ultralarge Pore Titanium Silicate Isomorphous to MCM–41 and its Application as a Catalyst for Selective Oxidation of Hydrocarbons," J. Chem. Soc., Chem. Commun., pp. 147–148, 1994.

Tanev et al., "Titanium–Containing Mesoporous Molecular Sieves for Catalytic Oxidation of Aromatic Compounds," Nature, vol. 368, pp. 321–323, Mar. 1994.

*Primary Examiner*—Mark L. Bell
*Assistant Examiner*—David Sample
*Attorney, Agent, or Firm*—Lorusso & Loud

[57] ABSTRACT

A titanium-containing porous silica having a molecular sieve framework in which more than 3 mole % but not more than 25 mole % of silicon ions are isomorphously substituted by titanium ions. The porous silica may be obtained by gradually adding a liquid containing water and an alkylamine to a mixture containing a silicon alkoxide and a titanium alkoxide with stirring to hydrolyze the silicon alkoxide and the titanium alkoxide and to obtain a gel. The gel is then dried and calcined to obtain the titanium-containing porous silica.

8 Claims, 3 Drawing Sheets

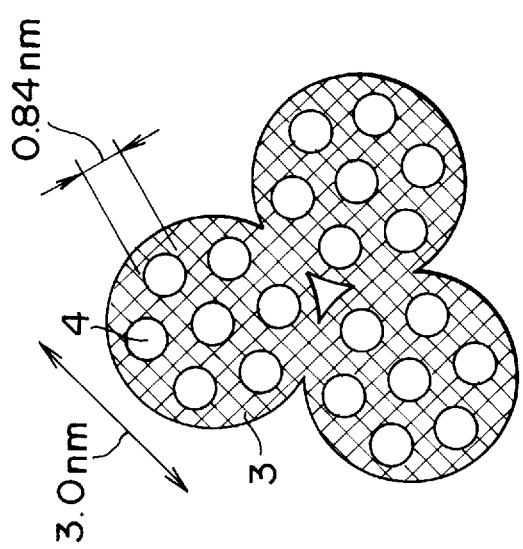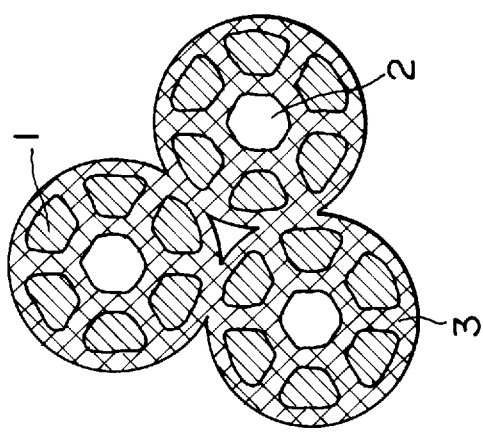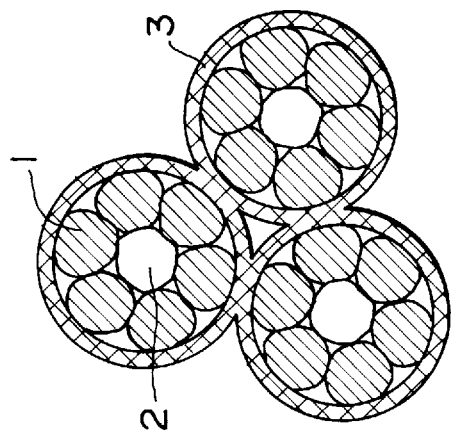

TITANIUM-CONTAINING POROUS SILICA AND PROCESS OF PREPARING SAME

BACKGROUND OF THE INVENTION

This invention relates to a novel titanium-containing porous silica and to a process for the preparation thereof.

Isomorphously substituted Ti-containing porous silica materials are of great interest from both commercial and academic points of view because of their extraordinary potential as oxidation catalysts. The incorporation of titanium into a silicate framework results in the formation of isolated Ti centers capable of undergoing a facile coordination change and of forming an active peroxo-titanium complex upon contact with $H_2O_2$ and TBHP (terbutyl hydroperoxide). This peroxo-titanium complex is responsible for unique selectivities in oxidation reactions of organic compounds.

A variety of Ti-containing microporous (with an average pore diameter of 2 nm or less) or mesoporous (with an average pore diameter of 2–50 nm) silica materials, such as TS-1, TS-2, Ti-Beta, Ti-MCM-41 and Ti-MCM-48, have been developed in recent years. Ti-containing microstructured materials are prepared by use of a molecular templating agent, whereas a liquid crystal templating agent with cooperative assembly of surfactants and inorganic species is used for the preparation of mesostructured materials. Initial attempts at incorporation of titanium into micro- or mesostructured materials have shown that up to 3 mol % titanium can be isomorphously substituted into a silicate framework. The major problem in the preparation of Ti-containing silica is domain formation due to a difference in reactivity between titanium and silicon alkoxides. Modification of the highly labile titanium alkoxide by chelation and prehydrolysis of the less reactive silicon alkoxide has been proposed for compensating for the differences in hydrolysis and condensation rates of these compounds. However, the resultant material has the properties of amorphous titanium-silicon mixed oxides.

SUMMARY OF THE INVENTION

The present invention provides a titanium-containing porous silica having a molecular sieve framework in which 3–25 mole % of silicon ions are isomorphously substituted by titanium ions.

The Ti-containing porous silica preferably has an average pore diameter of 2 nm or less and a specific surface area of at least 500 $m^2/g$.

The present invention also provides a process for the preparation of a titanium-containing porous silica, including gradually adding a liquid containing water and an alkylamine to a mixture containing a silicon alkoxide and a titanium alkoxide with stirring in an amount providing a molar ratio of a total of the silicon alkoxide and the titanium alkoxide to the water of 0.5–1.5 to hydrolyze the silicon alkoxide and the titanium alkoxide and to obtain a gel. The liquid has a content of the alkylamine of 1.5–3.0 moles per mole of the water, while the mixture has a molar ratio of the silicon alkoxide to the titanium alkoxide of in the range of 1:0.02 to 1:0.27. The gel is then dried and calcined to obtain the titanium-containing porous silica.

The present invention provides a simple method for the preparation of a novel and exceptional Ti-containing porous silica utilizing both molecular and supramolecular templating processes. Although not bound by the theory, the formation of the novel Ti-containing porous silica is considered to occur as follows.

First, by adding a mixture of an alkylamine with water (forming micelles) to a mixture of a silicon alkoxide with a titanium alkoxide, a soft mesostructured assembly of the micelles composed of water molecules 2 and alkylamine molecules 1 with silicon and titanium alkoxide species 3 is formed through weak hydrogen bonding therebetween, as shown in FIG. 1(a). The soft mesostructured assembly then solidifies to form a transparent gel containing aggregates having a mesostructured matrix of inorganic species 3 organized around neutral alkylamine molecules 1, each serving as a template, for the formation of a porous array inside the matrix (FIG. 1(b)). When the gel is aged, dried and calcined, the organic templates and water are removed to form a Ti-containing porous silica having a high surface area (FIG. 1(c)).

FIG. 2 shows the X-ray diffraction patterns of representative Ti-containing porous silica (with 14.73 mol % Ti), calcined in air at 773 K and 1273K, respectively. The sample calcined at 1273 K has anatase phase of $TiO_2$ indicating the transformation of framework titanium species into a crystalline titania phase. However, framework substituted titanium species are quite stable up to 973 K. The sample exhibits a single diffraction peak corresponding to interplanar distance of 3.0 nm, indicating the presence of a periodically ordered porous structure.

The isomorphous substitution of Si with Ti results in the formation of Si—O—Ti bonds which are known to be attributed to an absorption peak at 960 $cm^{-1}$ in IR spectrum. However, in mixed oxides the vibration band at 960 $cm^{-1}$ is overlapped by the dominating presence of surface Si—OH groups which cause broad band absorbance between 920 and 960 $cm^{-1}$. The silanol band, however, disappears when the sample is dried at elevated temperatures. It has been revealed that the Ti-containing porous silica according to the present invention retains the vibration band at 960 $cm^{-1}$ even when heated at 673 K. The above results obtained by the X-ray analysis and IR analysis indicate that (a) Ti is isomorphously substituted for Si to form Ti—O—Si bonds rather than Ti—O—Ti.

FIG. 3 shows $N_2$ adsorption-desorption isotherm for the above representative Ti-containing silica (with 14.73 mol % Ti, calcined at 773 K). As appreciated, the curve shows Langumuir's adsorption isotherm and the t curve indicates that the sample is microporous and exhibits uniform framework-confined microporosity.

The interplanar distance of the Ti-containing porous silica according to the present invention is preferably in the range of 3–7.2 nm and may be varied by changing of the gelation or aging conditions. For example, by salvation of the precursor gel obtained by controlled hydrolysis of silicon and titanium alkoxides with water or alcohol prior to subsequent aging and drying, a larger interplanar distance is obtainable. Another example of the way of altering the interplanar distance is aging the precursor gel at higher temperatures. However, the micropore diameter is not increased by the above treatments. The micropore diameter can be increased by use of longer alkyl chained amine micelles.

The Ti-containing porous silica according to the present invention has a large surface area, a high content of Ti and a high thermal stability and, hence, offers great promise in the catalysis of a variety of reactions. Further, the synthesis of the novel Ti-containing silica represents a novel combination of two fundamentally different approaches to template-mediated synthesis of porous materials. In addition to being used in catalysis, the Ti-containing porous silica according to the present invention may be utilized in applications in a wide variety of fields, such as molecular sieving, coating, thin films, membranes, non-linear optics, thermal or acoustic insulation and glasses with low thermal expansion coefficients.

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIGS. 1(a) through 1(c) are schematic illustrations explanatory of the mechanism of the formation of Ti-containing porous silica according to the present invention;

DETAILED DESCRIPTION OF THE PREFERRED EMBODIMENTS OF THE INVENTION

Figure 2:
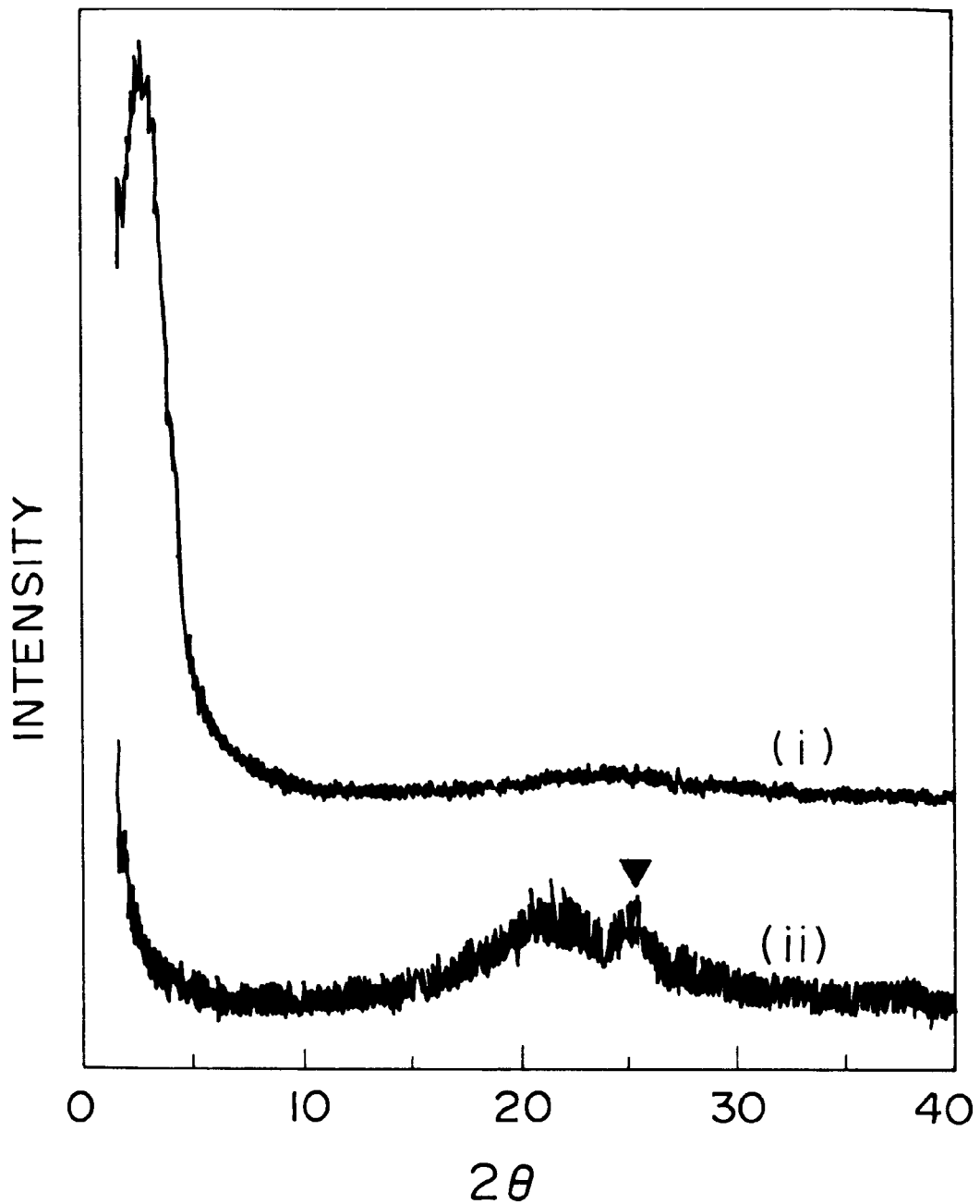
FIG. 2 shows powder X-ray diffraction patterns of samples of Ti-containing porous silica.
Figure 3:
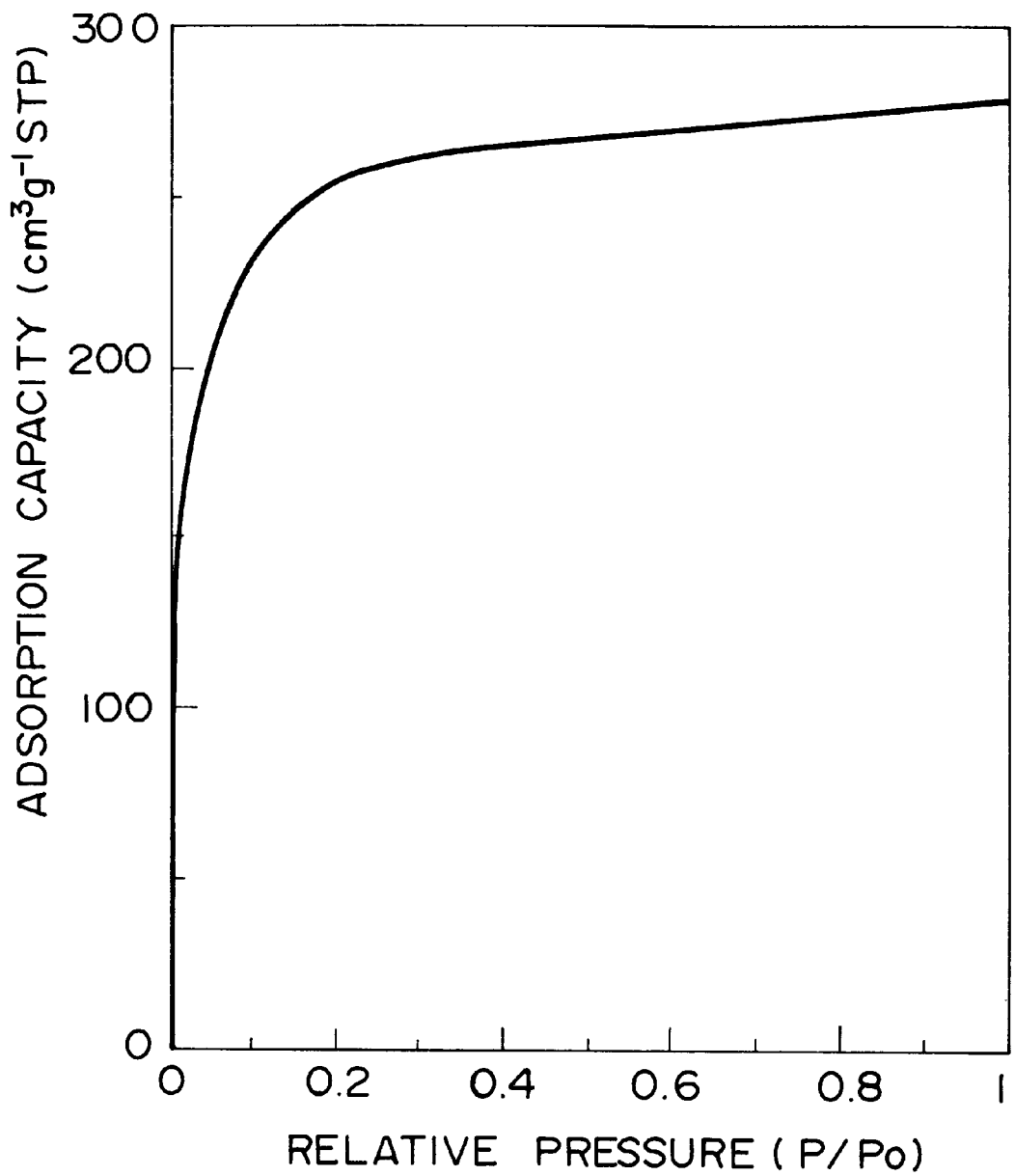
FIG. 3 shows nitrogen adsorption-desorption isotherm for the Ti-containing porous silica according to the present invention.

A titanium-containing porous silica according to the present invention (hereinafter referred to as MTM) has a molecular sieve framework in which more than 3 mole % but not more than 25 mole % of silicon ions, preferably 4–20 mole % of silicon ions, are isomorphously substituted by titanium ions.

MTM may be produced from a mixture of a silicon alkoxide and a titanium alkoxide and a liquid containing water and an alkylamine. Illustrative of suitable silicon alkoxide are tetramethyl orthosilicate, tetraethyl orthosilicate, tetraisopropyl orthosilicate and tetra-n-butyl orthosilicate, while examples of suitable titanium alkoxides include tetraethyl orthotitanate, tetraisopropyl orthotitanate and tetra-n-butyl orthotitanate. The mixture of a silicon alkoxide and a titanium alkoxide has a molar ratio of the silicon alkoxide to the titanium alkoxide of in the range of 1:0.02 to 1:0.27, preferably 1:0.022 to 1:0.25.

Any alkylamine may be used for the purpose of the present invention, though an alkylamine which is liquid at room temperature is preferred. Preferably, an alkylamine having 6–12 carbon atoms, more preferably 8–10 carbon atoms, is used. The alkylamine is used in an amount of 1.5–3.0 moles, preferably 1.8–2.4 moles per mole of the water.

The alkoxide mixture is mixed well, for example, with stirring for 10–20 minutes, to which the liquid containing water and an alkylamine is gradually added at ambient temperature with stirring in an amount providing a molar ratio of a total of the silicon alkoxide and the titanium alkoxide to the water of 0.5–1.5 to hydrolyze the silicon alkoxide and the titanium alkoxide and to obtain a gel. The alkylamine-containing aqueous liquid is preferably added dropwise to the alkoxide mixture at a rate of 1–20 moles per hour, more preferably 6–18 moles per hour, of the water per mole of a total of the silicon alkoxide and the titanium alkoxide.

After completion of the addition of the alkylamine-containing liquid, the reaction mixture forms a gel within 1–10 minutes. The gel is then aged, dried and calcine in a manner known per se to obtain MTM. The aging of the gel is preferably performed by permitting the gel to quiescently stand at room temperature for at least 24 hours, more preferably 48–96 hours. The drying of the gel is preferably carried out at 40–100° C., more preferably 45–60° C., for at least 20 hours, more preferably 24–48 hours. The aging and the drying may be continuously or simultaneously performed by controlling the temperature. The calcination is performed for removing the water, alkylamine and hydrolytic residues of the alkoxides and preferably carried out at a temperature of at least 400° C., more preferably 450–650° C., for 0.5–24 hours, more preferably 1–10 hours, in an oxygen-containing atmosphere such as in air.

Prior to the aging, water or an organic solvent may be added to the gel. The organic solvent is generally hydrophilic solvent preferably having a boiling point of 45–100° C., such as an alcohol, e.g. methanol or ethanol, or a ketone, e.g. acetone. By addition of a controlled amount and a selected kind of the water and/or organic solvent, the physical properties of MTM, such as specific surface area, pore volume, pore diameter and interplanar distance, can be controlled.

Preferred physical properties of MTM are as follows:

Specific surface area: at 500 m$^2$/g

Average pore diameter: 2 nm or less

Interplanar distance: 3.0–7.2 nm

The following examples will further illustrate the present invention. The measurement of the physical properties of MTM was carried out by the following methods. Interplanar spacing $d_{001}$ was measured with a Rigaku Rotaflex diffractometer (RU300 manufactured by Rigaku Inc.) equipped with a rotating anode and Cu—Kα radiation (wavelength λ=0.15417 nm). The measurement of BET specific surface area $S_{BET}$ (m$^2$/g), intrinsic specific surface area $S_{int}$ (m$^2$/g), pore diameter D (nm) and pore volume V (ml/g) were measured with BELSORP 28 (manufactured by Nippon Bel Inc.). The quantitative analysis of Ti and Si was made by ICP method using OPTIMA 3000 (manufactured by Perkin Elmer Inc.).

EXAMPLE 1

Tetraethyl orthosilicate (TEOS) and tetraethyl orthotitanate (TEOT) were blended in a molar ratio of TEOS to TEOT of 5:0.8 and stirred for 15 minutes, to which a solution of 2.11 moles of octylamine in 0.97 ml of water was slowly added ambient temperature in such an amount as to provide a molar ratio of a total of the both alkoxides to the water of 1:1, thereby to partially hydrolyze the alkoxides. The mixture made a transparent gel within a few minutes after completion of the addition of the amine solution. The gel was aged at room temperature for 3 days and then dried at 50° C. for 2 days. The dried gel was calcined at 500° C. for 2 hours to obtain MTM having a titanium content and physical properties as shown in Table 1.

EXAMPLE 2

Example 1 was repeated in the same manner as described except that the molar ratio of TEOS to TEOT was 5:1.1. The titanium content and the physical properties of MTM thus obtained are summarized in Table 1.

EXAMPLE 3

Example 1 was repeated in the same manner as described except that the molar ratio of TEOS to TEOT was 5:1.3. The titanium content and the physical properties of MTM thus obtained are summarized in Table 1.

EXAMPLE 4

Example 2 was repeated in the same manner as described except that, prior to aging, the gel was mixed with 9 mol of water and stirred for 5 minutes. The titanium content and the physical properties of MTM thus obtained are summarized in Table 1.

EXAMPLE 5

Example 2 was repeated in the same manner as described except that, prior to aging, the gel was mixed with 18 mol of water and stirred for 5 minutes. The titanium content and the physical properties of MTM thus obtained are summarized in Table 1.

EXAMPLE 6

Example 2 was repeated in the same manner as described except that, prior to aging, the gel was mixed with 6 mol of ethanol and stirred for 5 minutes. The titanium content and the physical properties of MTM thus obtained are summarized in Table 1.

EXAMPLE 7

Example 2 was repeated in the same manner as described except that the gel was immediately dried at 50° C. for 2 days without performing the aging at room temperature. The titanium content and the physical properties of MTM thus obtained are summarized in Table 1.

EXAMPLE 8

Example 2 was repeated in the same manner as described except that the gel was immediately dried at 100° C. for 2 days without performing the aging at room temperature. The titanium content and the physical properties of MTM thus obtained are summarized in Table 1.

EXAMPLE 9

Example 2 was repeated in the same manner as described except that the gel was immediately dried at 150° C. for 2 days without performing the aging at room temperature. The titanium content and the physical properties of MTM thus obtained are summarized in Table 1.

EXAMPLE 10

Example 1 was repeated in the same manner as described except that the molar ratio of TEOS to TEOT was 5:1 and that decylamine was substituted for octylamine. The titanium content and the physical properties of MTM thus obtained are summarized in Table 1.

EXAMPLE 11

Example 10 was repeated in the same manner as described except that, prior to aging, the gel was mixed with 6 mol of ethanol and stirred for 5 minutes. The titanium content and the physical properties of MTM thus obtained are summarized in Table 1.

EXAMPLE 12

Example 10 was repeated in the same manner as described except that dodecylamine was substituted for decylamine. The titanium content and the physical properties of MTM thus obtained are summarized in Table 1.

EXAMPLE 13

Example 12 was repeated in the same manner as described except that, prior to aging, the gel was mixed with 6 mol of ethanol and stirred for 5 minutes. The titanium content and the physical properties of MTM thus obtained are summarized in Table 1.

EXAMPLE 14

Example 2 was repeated in the same manner as described except that the calcination temperature was increased to 600° C. The titanium content and the physical properties of MTM thus obtained are summarized in Table 1.

EXAMPLE 15

Example 2 was repeated in the same manner as described except that the calcination temperature was increased to 700° C. The titanium content and the physical properties of MTM thus obtained are summarized in Table 1.

TABLE 1

| Example No. | Ti Content (mole %) | $d_{001}$ (nm) | $S_{BET}$ (m²/g) | $S_{int}$ (m²/g) | D (nm) | V (ml/g) |
|---|---|---|---|---|---|---|
| 1 | 12 | 3.0 | 1041 | 1037 | 0.84 | 0.42 |
| 2 | 15 | 3.0 | 990 | 984 | 0.84 | 0.42 |
| 3 | 25 | 3.0 | 591 | 587 | 0.84 | 0.25 |
| 4 | 15 | 6.4 | 767 | 763 | 0.96 | 0.40 |
| 5 | 15 | 7.2 | 773 | 711 | 1.0 | 0.40 |
| 6 | 14 | 4.7 | 885 | 879 | 0.80 | 0.35 |
| 7 | 15 | 5.0 | 844 | 840 | 0.60 | 0.32 |
| 8 | 15 | 5.1 | 681 | 679 | 0.60 | 0.23 |
| 9 | 15 | 5.1 | 781 | 777 | 0.90 | 0.34 |
| 10 | 13 | 3.8 | 721 | 717 | 0.96 | 0.36 |
| 11 | 12 | 4.9 | 624 | 557 | 0.90 | 0.27 |
| 12 | 13 | 3.8 | 868 | 845 | 1.14 | 0.66 |
| 13 | 12 | 4.5 | 824 | 817 | 1.00 | 0.45 |
| 14 | 15 | 3.0 | 854 | 851 | 0.84 | 0.36 |
| 15 | 15 | — | 715 | 710 | 0.84 | 0.30 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the preparation of a titanium-containing porous silica, comprising the steps of:

providing a mixture containing a silicon alkoxide and a titanium alkoxide and having a molar ratio of said silicon alkoxide to said titanium alkoxide of in the range of 1:0.02 to 1:0.27;

gradually adding a liquid containing water and an alkylamine to said mixture with stirring in an amount providing a molar ratio of a total of said silicon alkoxide and said titanium alkoxide to said water of 0.5–1.5 to hydrolyze said silicon alkoxide and said titanium alkoxide and to obtain a gel, said liquid having a content of said alkylamine of 1.5–3.0 moles per mole of said water;

drying said gel; and calcining said dried gel.

2. A process as claimed in claim 1, wherein said silicon alkoxide is selected from the group consisting of tetramethyl orthosilicate, tetraethyl orthosilicate, tetraisopropyl orthosilicate and tetra-n-butyl orthosilicate and wherein said titanium alkoxide is selected from the group consisting of tetraethyl orthotitanate, tetraisopropyl orthotitanate and tetra-n-butyl orthotitanate.

3. A process as claimed in claim 1, wherein the molar ratio of said silicon alkoxide to said titanium alkoxide is in the range of 1:0.022 to 1:0.25.

4. A process as claimed in claim 1, wherein said liquid has a content of said alkylamine of 1.8–2.4 moles per mole of said water.

5. A process as claimed in claim 1, wherein said alkylamine has 6–12 carbons.

6. A process as claimed in claim 1, further comprising aging said gel for at least two days before said drying.

7. A process as claimed in claim 1, wherein said calcination is carried out at a temperature of at least 400° C. for 0.5–24 hours.

8. A process as claimed in claim 6, further comprising mixing said gel with a liquid selected from the group consisting of water and organic solvents before said aging.

\* \* \* \* \*